INVENTOR.
MAX D. LISTON

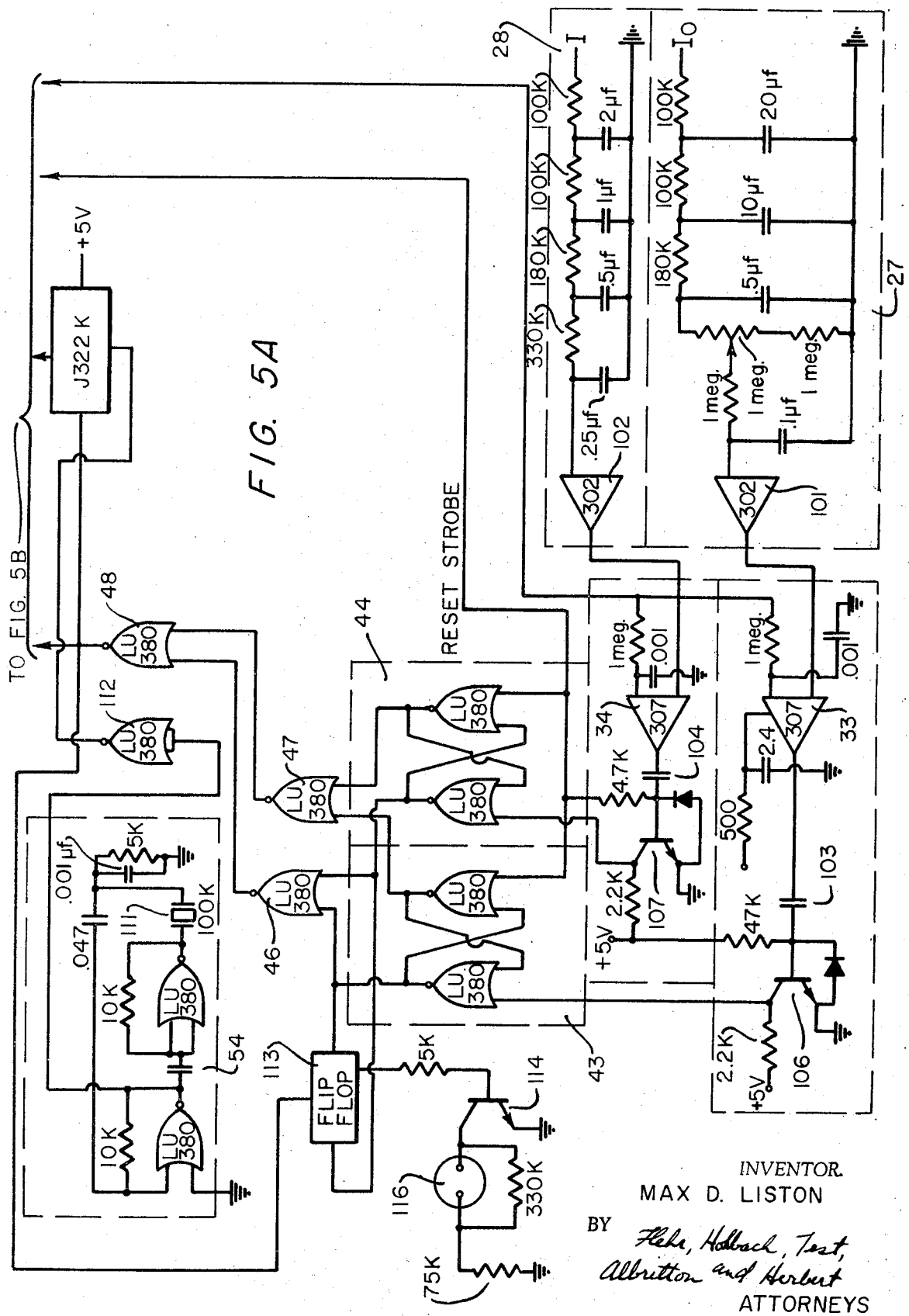

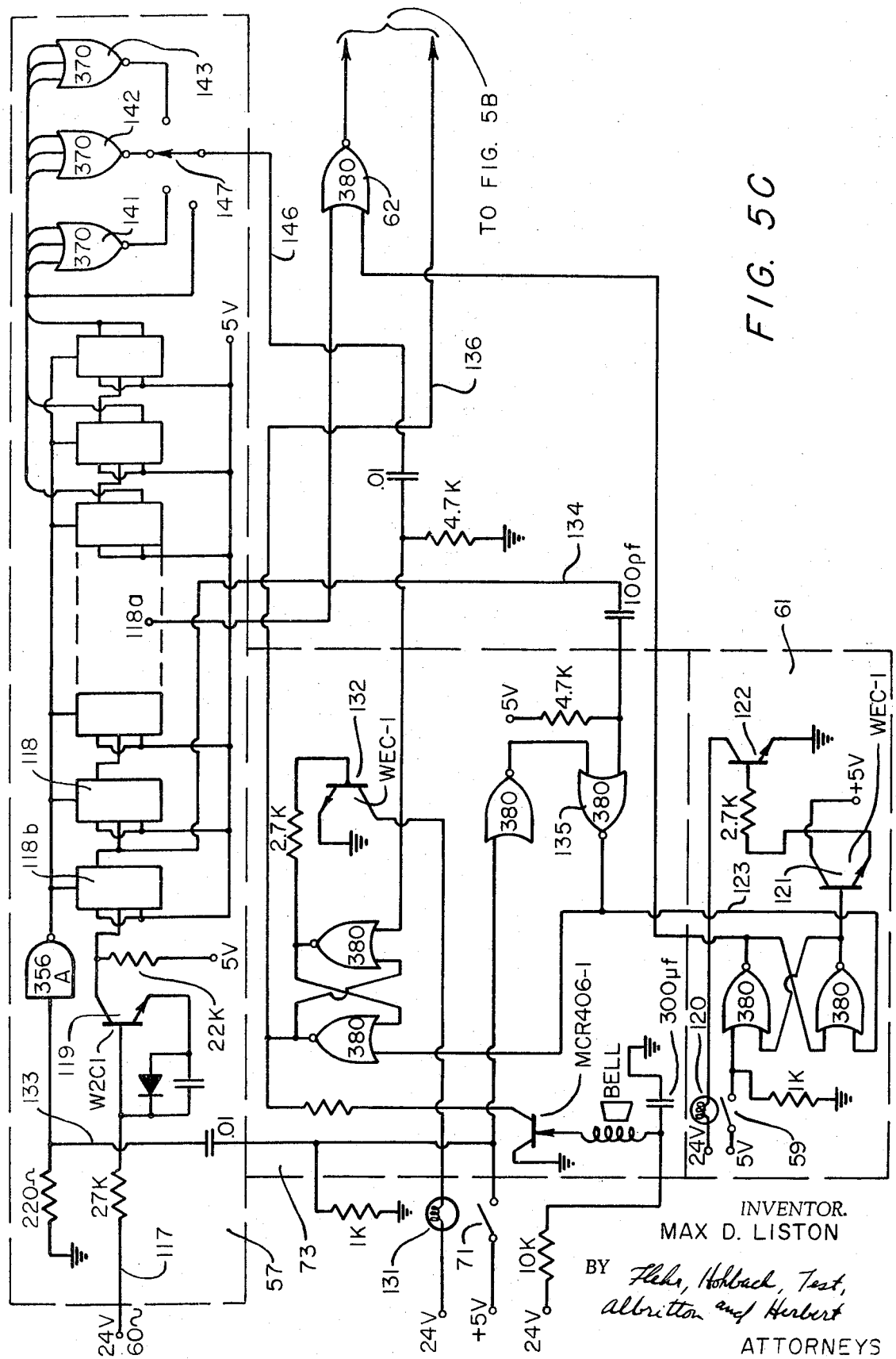

United States Patent Office 3,664,744
Patented May 23, 1972

3,664,744
LOG RATIO CIRCUIT FOR DOUBLE BEAM SPECTROPHOTOMETERS
Max D. Liston, Irvine, Calif., assignor to Smith Kline Instruments, Inc., Palo Alto, Calif.
Filed Sept. 2, 1969, Ser. No. 854,647
Int. Cl. G01j 3/42, 1/10; G01n 21/20
U.S. Cl. 356—88                                     2 Claims

ABSTRACT OF THE DISCLOSURE

A ratio meter for giving the log of the ratio of two voltages. An RC circuit is charged and allowed to exponentially discharge. Comparator means receive the two voltages and the voltage of the RC circuit and provide output signals when each of the two voltages is equal to the voltage of the RC circuit. The time lapse between said two signals corresponds to the log of the ratio of the two voltages.

BACKGROUND OF THE INVENTION

This invention relates generally to a log ratio meter and more particularly to a log ratio meter for use as a spectrophotometer for measuring optical density, concentration or the rate of change of optical density or concentration.

In absorption spectroscopy the concentration of an unknown under ideal conditions can be calculated from Beer's Law which states:

$$C = A \log I_0/I$$

where:

C is the concentration of the unknown
A is a constant for the determination
$I_0$ is the intensity of light with a reference cell
I is the intensity with a cell containing the unknown Where it is desired to build a spectrophotometer that will read directly in concentration, the required mathematics may be performed by electrical circuit means.

In the prior art, this has been accomplished in several ways. $I_0$ has been held at a fixed value and the indicating meter has been provided with a log scale. This has the disadvantage that the scale divisions are, for certain concentrations, difficult to read. Other systems have used log amplifiers. This, of course, requires a non-linear element, usually a P-N junction, to give the logarithmic relationsip. A log amplifier has the disadvantage that the log element only approximates a log function. Further, such amplifiers are generally temperature sensitive. Another method which has been employed is to use a diode ladder to approximate the log function. This has the disadvantage of being an approximation. It is very difficult to obtain a good approximation when more than one decade of range is required.

SUMMARY OF THE INVENTION AND OBJECTS

It is a general object of the present invention to provide an improved log ratio meter.

It is another object of the present invention to provide a log ratio meter for use in spectroscopy.

It is a further object of the present invention to provide a log ratio meter in which a stable RC circuit is employed to obtain the log function.

It is still a further object of the present invention to provide a log ratio meter capable of measuring reaction rates.

It is a further object of the present invention to provide a ratio meter with digital or numerical output reading.

The foregoing objects are accomplished by applying first and second voltages to comparators which are connected to receive a voltage from an RC circuit which is periodically charged and allowed to decay exponentially and provide output signals when the voltages are equal to the RC voltage. The time lapse between output signals is an indication of the log of the ratio between the first and second voltage. The two pulses can be employed to control the application of a constant frequency to a counter whereby to provide a numerical or digital output corresponding to the ratio of the log of the first and second voltages.

BRIEF DESCRIPTION OF THE DRAWINGS

FIGS. 5A, 5B and 5C show a circuit diagram of a spectrophotometer in accordance with the present invention.

DESCRIPTION OF THE PREFERRED EMBODIMENT

Figure 1:
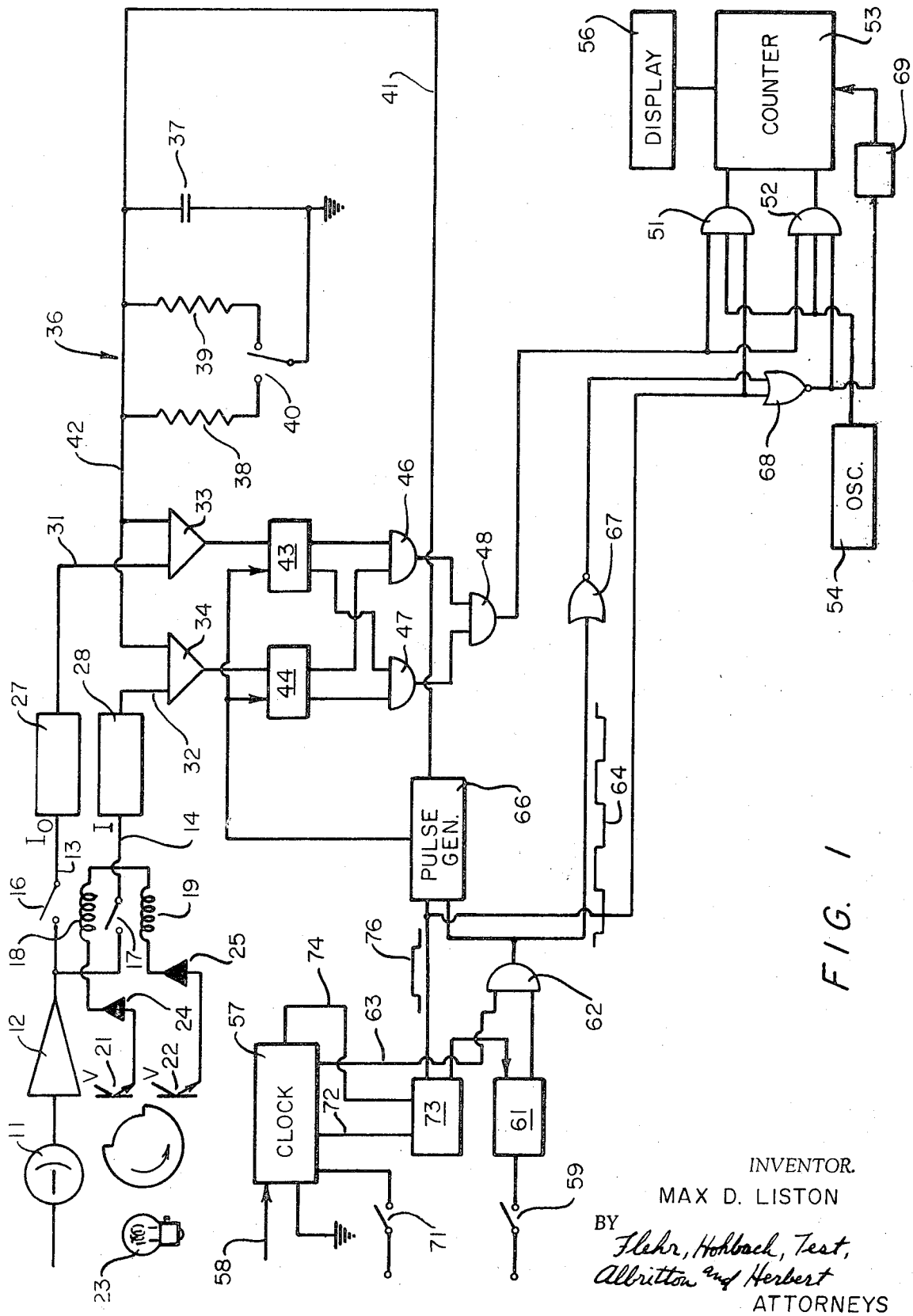
FIG. 1 is a block diagram of a ratio meter in accordance with the present invention as embodied in a spectrophotometer.

The spectrophotometer shown in FIG. 1 includes a transducer 11 which receives the transmitted light and provides an electrical output signal which is applied to a signal amplifier 12. The signal applied from the transducer 11 is alternately the signal from a reference and a signal from the sample under consideration to provide a low frequency output signal to the amplifier. A synchronous demodulator is connected to the amplifier 12 and serves to alternately provide the signals corresponding to the reference $I_0$ and sample I at the lines 13 and 14. The demodulator may, for example, comprise contacts 16 and 17 which are controlled by coils 18 and 19, respectively. The coils are connected to photodiodes 21 and 22 which are alternately illuminated from a light source 23. The output is applied to switching amplifiers 24 and 25 which alternately energize the coils to close the contacts. The squarewaves having amplitude corresponding to light intensity appearing on the lines 13 and 14 are applied to filters 27 and 28. The output from the filters are DC voltages whose average value corresponds to the intensity of light impinging upon the transducer 11. The voltages on the lines 31 and 32 are applied to comparators 33 and 34.

A voltage from RC circuit 36 is also applied to the comparators. The RC circuit 36 includes capacitor 37 and resistors 38 and 39, either of which can be connected in parallel with the capacitor 37 by a switch 40. Means, to be presently described, are provided for applying charging pulses along the line 41 to the capacitor to charge it to a predetermined voltage. The voltage on the RC circuit is applied along the line 42 to the comparators 33 and 34.

Figure 2:
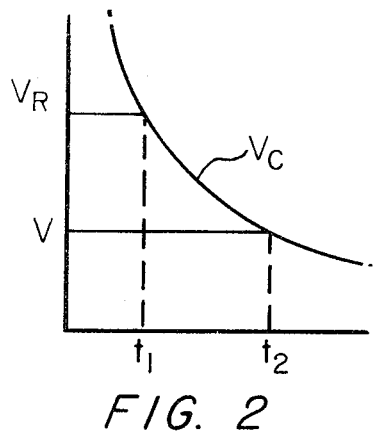
FIG. 2 shows the RC circuit discharge curve and illustrates the generation of output pulses by the comparators.

Referring now to FIG. 2, the voltage $V_c$ appearing at the capacitor 37 is shown as exponentially decaying in accordance with the values of resistance and capacitor in a well-known manner. When the reference voltage $V_R$ corresponding to light intensity $I_0$ is equal to the voltage $V_c$, a signal is generated by the comparator 33. This signal occurs at the time $t_1$. Thereafter, a second signal is generated when the voltage V corresponding to light intensity I on the line 32 is equal to the voltage $V_c$. This signal occurs at the time $t_2$. The time lapse between $t_1$ and $t_2$ corresponds to the log of the ratio of the voltage $V_R/V$ or $I_0/I$ as follows:

$$V_R = I_0 = V_c e^{-t_1/RC}$$
$$V = I = V_c e^{-t_2/RC}$$
$$\log \frac{V_R}{V} = \log \frac{I_0}{I} = \log \frac{V_c e^{-t_1/RC}}{V_c e^{-t_2/RC}}$$
$$= \log e^{-t_1/RC} - \log e^{-t_2/RC}$$
$$= t_1/RC - t_2/RC$$
$$= 1/RC(t_1 - t_2)$$

The voltage outputs from the comparators 33 and 34 are applied to bistable circuits 43 and 44, respectively, which are periodically reset as will be presently described. The outputs from the bistable circuits are applied to an exclusive OR circuit including circuits 46 and 47 connected to receive the output from the bistable circuits 43 and 44 and whose output is applied to a third circuit 48. The output from the exclusive OR circuit appearing at circuit 48 is applied to AND gates 51 and 52 which control the input to electronic counter 53 from oscillator 54 which operates at a selected frequency. The gates 51 and 52 control the application of pulses from the oscillator to either count down or up, respectively. The gates also receive a control signal from a clock circuit, as will be presently described, to control application of pulses for up or down counting.

When the reference voltage corresponds to the voltage on the capacitor, a first pulse is generated by the comparator 33 which serves to change the state of the bistable circuit 43 which, in turn, generates a signal which is applied to the exclusive OR gate. The exclusive OR gate applies a signal to the counter gates 51, 52 whereby the oscillator output is applied to the up counter and counted. The up counter gate 52 is conditioned to be turned on or opened responsive to the signal to pass the oscillator output to the counter to be counted, while the down counter gate 51 is conditioned to inhibit application of the oscillator output. When the voltage decays to a value corresponding to the voltage V on line 32, the bistable circuit 44 generates a signal which is also applied to the exclusive OR gate. Since two signals are present, there is no output from the exclusivve OR circuit and the gate 52 is closed. The count in the counter is proportional to the time lapse between $t_1$ and $t_2$ which is proportional to the log of the ratio of the two voltages as previously described. The output indicator can be calibrated to indicate O.D. or concentration directly. The count on the counter 53 may be displayed by display unit 56.

Operation and control of cycling of the circuit and operation of the counter is through a timing circuit which includes a clock 57 which has a constant frequency applied thereto at the terminal 58. In measuring optical density, the ratio meter is recycled periodically. The control switch 59 is closed to obtain a reading of optical density. The switch controls a bistable circuit 61 whose output is applied to NAND circuit 62. The NAND circuit 62 is connected to clock 57 and cyclically forms an output one or zero applied along line 63 to the NAND circuit 62. The pulses 64 indicate the output at NAND circuit 62. The frequency of the pulses 64 corresponds to the cycle time of the clock. These pulses are applied to pulse generator 66 which generates recharging pulses for the RC circuit. The pulses are also applied to inverter 67 which is connected to inverter 68 whose output drives a reset circuit 69 to reset the counter and conditions the gate 52 so that the counter counts up when the signal from the exclusive OR circuit 48 is applied.

Figure 3:
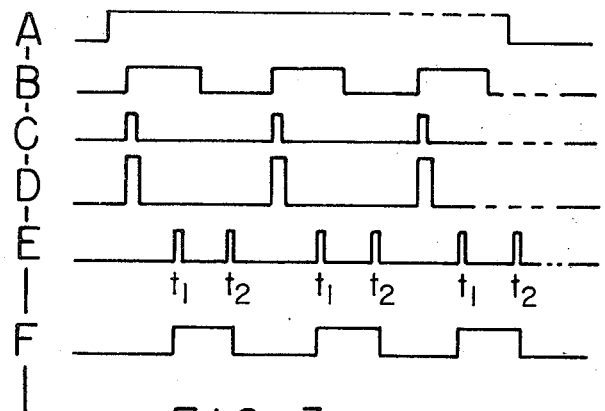
FIG. 3 shows the voltage appearing in various places in the circuit of FIG. 1 in the optical density mode of operation.

Referring to FIG. 3, the voltages at various parts of the circuit during an O.D. measurement are shown. When switch 59 is closed, the bistable circuit 61 provides an output voltage A. The output signal B from the clock is applied to the NAND circuit 62 and the output is identical as long as the voltage A is present. This signal enables the up count gate 52 and forms reset pulses shown at C and charging pulses shown at D. The comparator pulses are shown at E. The control pulse applied from the exclusive OR circuit to the gate 52, and thus the gate time, is shown at F. It is noted that the counter is reset and in readiness prior to receiving this signal.

In order to measure rate, the instrument is cycled to make two readings of optical density and substract one from the other. To obtain a rate reading, the switch 71 is closed. This resets the clock 57 which, after a predetermined time, provides a signal along the line 72 to the bistable circuit 73 which is then triggered to one state. After a predetermined time determined by the clock, a second pulse is applied along the line 74 to reset the bistable circuit. The bistable circuit generates a voltage signal of the type shown at 76 which has a predetermined exact duration. This signal is applied to the pulse generator which serves to generate a recharging pulse at the beginning and end of the pulse 76 to recharge the RC circuit and reset the bistable circuits 43 and 44. Thus, the comparators provide a first reading of optical density at the beginning of the control signal 76 and a second reading at the end. The pulse 76 is also applied to the circuit 68 which serves to clear the counter at the beginning and enable the up count gate 52. At the end of the pulse, the down count gate 51 is enabled whereby to count down during the next O.D. reading. The counter is not cleared.

Figure 4:
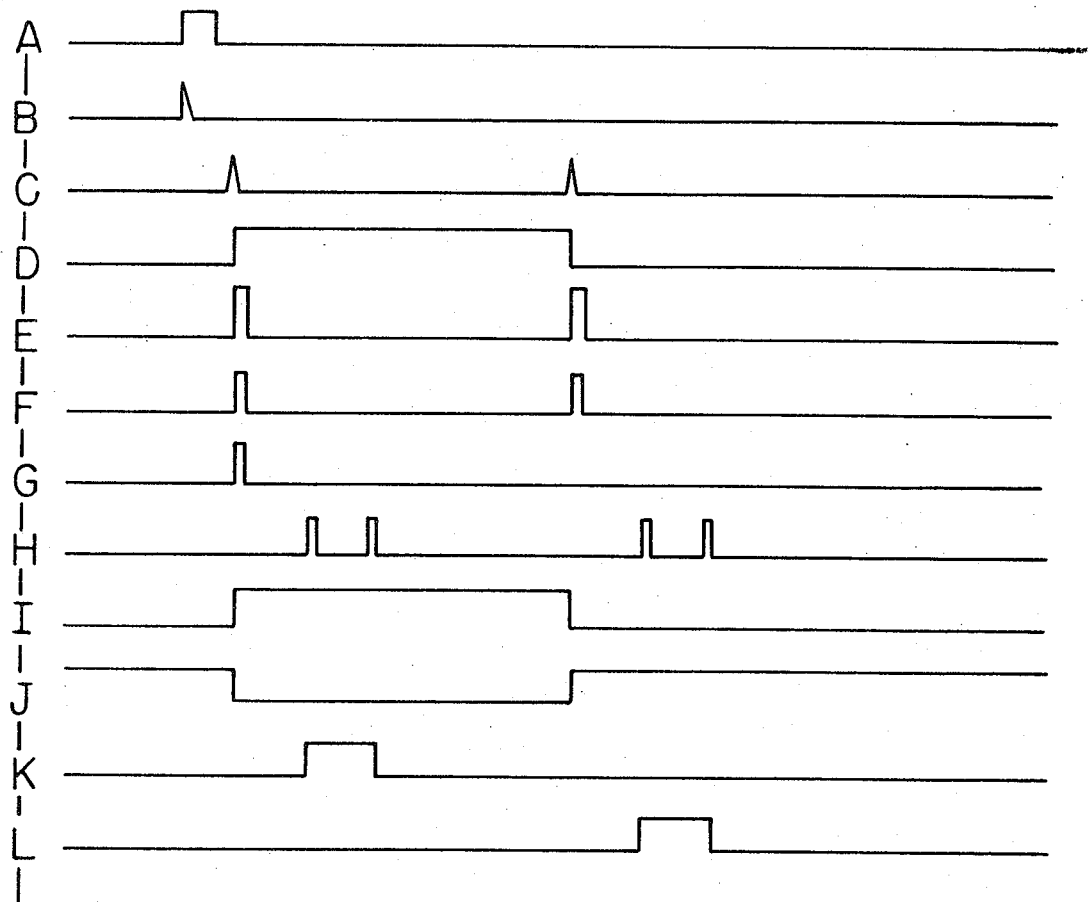
FIG. 4 shows the voltages appearing in various parts of the circuit of FIG. 1 in the rate mode of operation.

Operation is shown by the voltage waveforms of FIG. 4. Switch closure is shown at A. B shows the clock reset signal. C shows the divider output pulses having a fixed timing. D shows the output of bistable circuit 76. E shows the two charging pulses. F shows reset pulses for the bistable circuits. G shows the counter reset pulse. H shows the comparator outputs. I shows the counter gate enabling signal for the up count, and J the counter gate enabling signal for the down count. K and L show the counter gate opening for up and down counts, respectively, whereby the counter displays the difference of optical density or the rate of change of optical density over the predetermined selected time corresponding to the period of pulse D.

A detailed circuit diagram is shown in FIG. 5. The filter 27 comprises an RC network with its output applied to a buffer amplifier 101 and thence to comparator 33. The filter 28 also includes an RC network having its output applied to a buffer amplifier 102 connected to the comparator 34.

The outputs of the comparators 33 and 34 are applied through capacitors 103 and 104, respectively, to the base of transistors 106 and 107 which provide gating pulses for application to the associated bistable circuits 43 and 44. The outputs of these logic circuits are applied to the exclusive OR circuit comprising logic circuits 46, 47 and 48. The output of logic circuit 48 is applied to control the gates 51 and 52 associated with the counter (not shown).

The oscillator 54 is a crystal-controlled oscillator including a crystal 111 and associated circuitry. The output of the oscillator is applied through a buffer amplifier 112 and circuit 115 to the gates 51 and 52. The circuit 115 receives a control signal from the OR circuit logic circuit 48. The circuit 115 minimizes counter jitter by assuring that the OR circuit is opened for at least one clock pulse interval.

In certain instances, the first voltage $V_R$, $I_0$, may be less than the sample voltage, V, I. The instrument should indicate this fact. For this purpose, there is provided a flip-flop 113 which is connected to receive the output from the bistable circuits 43 and 44 and the output from the gate 48. If the output from the gate 48 precedes the output from the bistable circuit 43, the flip-flop 113 serves to energize the base of transistor 114 which controls the indicating lamp 116 to indicate the fact that V, I is greater than $V_R$, $I_0$.

The clock 57 comprises a binary counter including a plurality of integrated circuits 118 connected to receive a standard frequency at the line 117 which is applied through an amplifier 119. By connecting to selected ones of the circuits, an output is obtained having a predetermined time relationship with respect to the input, that is, a ONE will appear at the output.

In the optical density mode of operation, an output is derived at one of the circuits 118, for example, 118a, and applied to the NAND circuit 62 which is connected to the bistable circuit 61 and provides an output corresponding to the state of the circuit 118a.

When the O.D. switch 59 is momentarily closed, it latches the bistable circuit 61. The result is that an enable signal is applied to the NAND circuit 62 whereby signals from the clock are applied through the inverter 123 to the pulse generating circuit 66. The lamp or indicator 120 is energized by transistors 121 and 122 controlled by the bistable circuit. A diode steering circuit 126 provides controls for application of the pulses to the transistors 127 and 128 which form the charging pulses for application to the RC circuit 36. The inverter 68 provides pulses to the reset circuits and enables the gate 52.

In the rate mode, the rate switch 71 is momentarily closed to latch the circuit 73. The circuit 73 controls transistor 132 which energizes indicating lamp 131 to indicate operation in the rate mode. The momentary closure of switch 71 applies a reset signal voltage to the clock 57 along the line 133. When an output is generated by the first clock circuit 118b, a pulse appears on the line 134 and is applied to the AND gate 135 to trigger the bistable circuit 61 to return to an off mode whereby to disable the NAND circuit 62, and simultaneously trigger the bistable circuit 73 into its first state. The output from the bistable circuit 73 appears on the line 136 and the voltage is maintained until the clock provides a pulse from circuits 141, 142, 143 to the line 146. This pulse serves to reset the bistable circuit. The time period between the pulse on line 134 and that on line 146 is selected by switch 147 which can be selectively connected to one of the circuits 141, 142 or 143. When the bistable circuit is first triggered, it serves to reset the comparators, recharge the RC circuits, enable the up counter and reset the comparator circuits as previously described and to give a reading or count of optical density. The reading or count is then held in the counter until the bistable circuit is switched by the pulse along the line 146, at which time the RC circuit is recharged, the comparator circuits are reset and the down counter is enabled, and a second count of optical density is made. The final count in the counter corresponds to the difference in optical density, as previously described. This count is displayed until additional commands are given through momentary closure of switch 59 or 71.

Figure 5B:
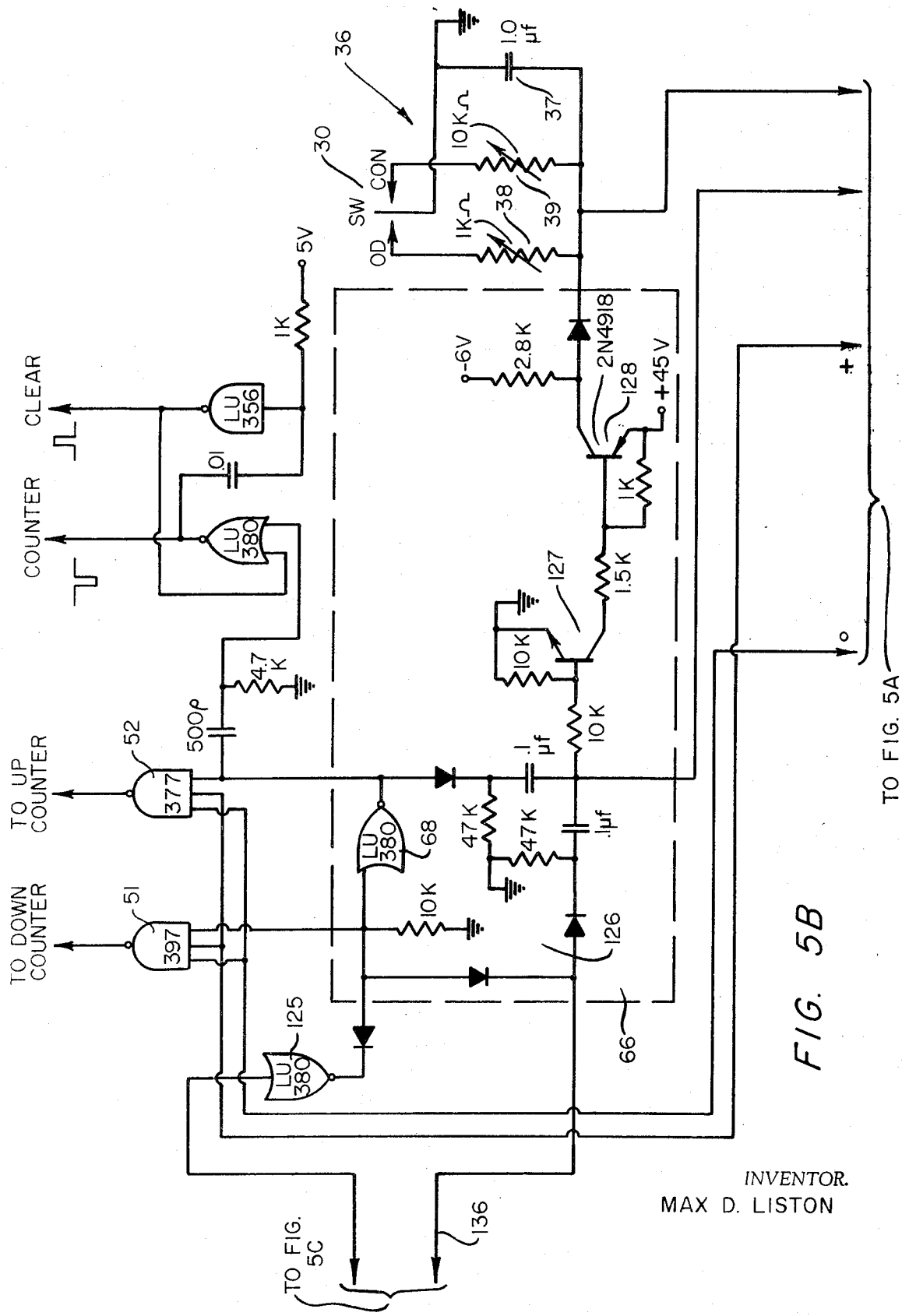

A circuit as shown in FIGS. 5A, 5B and 5C was constructed with the values shown. In operation, the circuit provided values of absorbance and rates with accuracies heretofore not obtainable with simple circuits.

I claim:

1. In a double beam spectrophotometer having a reference beam of intensity $I_0$ and a sample beam of intensity $I$, means for providing an indication which is proportional to log $I_0/I$, comprising: means for generating first and second voltages proportional to $I_0$ and $I$ respectively, a resistive-capacitive circuit, means for charging said circuit to a predetermined voltage greater than said first or second voltages and allowing it to discharge exponentially, first comparator means connected to receive the first volage and the voltage from said resistive-capacitive circuit and serving to generate a first output signal when the voltages are substantially equal, a second comparator means connected to receive the second voltage and the voltage from the resistive-capacitive circuit and serving to generate a second output signal when the voltages are substantially equal, means for indicating the time interval between said first and second output signals to thereby give an indication proportional to log $I_0$, $I$, said means for indicating the time interval including counter means, first and second bistable means each having complementary outputs and responsive to said first and second output signals respectively to reverse said outputs, and first and second exclusive OR gates respectively coupled to similar outputs of said bistable means the outputs of said gates providing a coincidence signal to enable said counter means in response to one of said first or second output signals, said coincidence signal ceasing in response to the later occurrence in time of the other of said first or second output signals, and bistable indicating means responsive to said first and second output signals to visually indicate which of said first or second output signals occurs first in time.

2. A double beam spectrophotometer as in claim 1 in which said bistable indicating means is coupled to the inputs of one of said OR gates.

References Cited

UNITED STATES PATENTS

| 3,337,738 | 8/1967 | Price | 250—226 |
| 3,449,050 | 6/1969 | Keahl | 356—88 |
| 3,528,749 | 9/1970 | Bowker | 356—202 |

RONALD L. WILBERT, Primary Examiner

V. P. McGRAW, Assistant Examiner

U.S. Cl. X.R.

250—226; 324—99; 356—93, 204, 222, 229